US011811016B2

(12) United States Patent
Miao et al.

(10) Patent No.: US 11,811,016 B2
(45) Date of Patent: Nov. 7, 2023

(54) SERIES FORMATION SYSTEM (71) Applicant: ZHUHAI TITANS NEW POWER ELECTRONICS CO., LTD., Guangdong (CN)

(72) Inventors: Feng Miao, Guangdong (CN); Liguo Qiu, Guangdong (CN)

(73) Assignee: ZHUHAI TITANS NEW POWER ELECTRONICS CO., LTD., Guangdong (CN)

( * ) Notice: Subject to any disclaimer, the term of this patent is extended or adjusted under 35 U.S.C. 154(b) by 0 days.

(21) Appl. No.: 17/775,300

(22) PCT Filed: Sep. 2, 2020

(86) PCT No.: PCT/CN2020/112947
§ 371 (c)(1),
(2) Date: May 8, 2022

(87) PCT Pub. No.: WO2022/011807
PCT Pub. Date: Jan. 20, 2022

(65) Prior Publication Data
US 2023/0138943 A1    May 4, 2023

(30) Foreign Application Priority Data

Jul. 13, 2020  (CN) .......................... 202010669723.6

(51) Int. Cl.
*H01M 10/04*      (2006.01)
*H02J 7/00*       (2006.01)
(Continued)

(52) U.S. Cl.
CPC ..... *H01M 10/0445* (2013.01); *H01M 10/441* (2013.01); *H02J 7/0069* (2020.01); *H02J 7/007182* (2020.01); *H01M 2004/028* (2013.01)

(58) Field of Classification Search
CPC ........... H01M 10/0445; H01M 10/441; H01M 2004/028; H02J 7/0069
See application file for complete search history.

(56) References Cited

U.S. PATENT DOCUMENTS

2008/0203969 A1*  8/2008  Kurihara ............. H01M 10/441
                                              320/145
2016/0105042 A1*  4/2016  Taylor ................ H01M 10/049
                                              320/134

FOREIGN PATENT DOCUMENTS

CN       101425694 A     5/2009
CN       202260525 U     5/2012
(Continued)

OTHER PUBLICATIONS

CN110400988 MT (Year: 2019).*
(Continued)

*Primary Examiner* — Alexander Usyatinsky
(74) *Attorney, Agent, or Firm* — Mark M. Friedman (57) ABSTRACT A series formation system is provided. The series formation system includes at least two formation modules and a power module. The power module is connected in series with the at least two formation modules. The at least two formation modules are connected in series. The power module is configured to supply power to the at least two formation modules. Each of the formation modules includes a battery cell and a formation control circuit. The formation control circuit is electrically connected to the battery cell. The formation control circuit is configured to control a voltage or a current provided by the power module to the battery cell, so that the battery cell is switched between a constant current charging mode and a constant voltage charging mode.

10 Claims, 3 Drawing Sheets (51) Int. Cl.
    *H01M 10/44*    (2006.01)
    *H01M 4/02*    (2006.01)

(56) References Cited

FOREIGN PATENT DOCUMENTS

| | | | |
|---|---|---|---|
| CN | 104333081 A | * | 2/2015 |
| CN | 206442129 U | | 8/2017 |
| CN | 109273788 A | | 1/2019 |
| CN | 109524731 | * | 3/2019 |
| CN | 109524731 A | | 3/2019 |
| CN | 110400988 | * | 11/2019 |
| CN | 110400988 A | | 11/2019 |

OTHER PUBLICATIONS

CN109524731 MT (Year: 2019).*
202010669723,Notification_to_Grant_Pate . . . _Invention_ (TRANSLATED), Aug. 31, 2022 (Year: 2022).*
International Search Report and the Written Opinion dated Apr. 16, 2021 From the International Searching Authority Re. Application No. PCT/CN2020/112947 and Its Translation of Search Report Into English (2 Pages).
Chinese Notice of Allowance dated Aug. 31, 2022 for CN202010669723.6.

* cited by examiner

SERIES FORMATION SYSTEM

FIELD OF DISCLOSURE

The application relates to secondary battery manufacturing technologies, and more particularly, to a series formation system.

DESCRIPTION OF RELATED ART

When forming batteries, multiple batteries can be connected in series. By connecting multiple batteries in series and forming at the same time, a number of wires and energy loss caused by the wires can be effectively saved. When the battery is charged to a specified voltage value with constant current, it needs to switch to a constant voltage charging mode.

However, due to fluctuation between individual batteries connected in series, times to reach the specified voltage value during constant current charging are varying. For existing series forming devices, multiple batteries connected in series are first placed in a constant current charging device for constant current charging. When some of the multiple batteries connected in series reach the specified voltage value, the batteries that reach the specified voltage value are transferred to a constant voltage charging device for constant voltage charging. For the above-mentioned formation method, several devices are required to support completion of a formation process, formation efficiency is low, and battery quality after the formation is affected.

SUMMARY

Based on this, it is necessary to provide a series formation system for above technical problems.

An embodiment of the application provides a series formation system configured for battery formation. The series formation system includes a power module and at least two formation modules.

The power module is connected to the at least two formation modules in series. The at least two formation modules are connected in series. The power module is configured to supply power to the at least two formation modules.

Each of the formation modules includes a formation control circuit and a battery cell. The formation control circuit is electrically connected to the battery cell. The formation control circuit is configured to control a voltage value applied by the power module to the battery cell and/or to control a current provided by the power module to flow through the battery cell, so that the battery cell is switched between a constant current charging mode and a constant voltage charging mode.

During a formation process, the battery cell in the at least two formation modules with a voltage value lower than a preset voltage value is in the constant current charging mode; the battery cell with a voltage value higher than or equal to the preset voltage value is in the constant voltage charging mode.

In one of the embodiments, during the formation process, the battery cell of each of the formation modules is first charged in the constant current charging mode, and in the constant current charging mode, the formation control circuit is configured to directly switch the battery cell with the voltage value higher than or equal to the preset voltage value from the constant current charging mode to the constant voltage charging mode.

In one of the embodiments, each of the formation modules includes a power input end and a power output end.

When the at least two formation modules are connected in series, in a series connection direction, a power input end of a later formation module is electrically connected to a power output end of a former formation module.

In the series connection direction, a power input end of a first one of the formation modules is electrically connected to a positive electrode of the power module. A power output end of a last one of the formation modules is electrically connected to a negative electrode of the power module.

In one of the embodiments, the formation control circuit includes a first filter module, a current limiting module, a switch module, and a second filter module.

One end of the first filter module is electrically connected to the power input end, and another end of the first filter module is electrically connected to the power output end.

One end of the current limiting module is electrically connected to the power input end, and another end of the current limiting module is electrically connected to the switch module.

One end of the second filter module is electrically connected to the switch module, and another end of the second filter module is electrically connected to the power output end.

One end of the battery cell is electrically connected to the switch module, and another end of the battery cell is electrically connected to the power output end.

The switch module is electrically connected to the power output end.

The switch module includes at least a first state and a second state. When the switch module is in the first state, a current is configured to flow from the power input end through the current limiting module, the switch module, and the power output end in turn. When the switch module is in the second state, a current is configured to flow from the power input end through the current limiting module, the switch module, the battery cell, and the power output end in turn.

In one of the embodiments, when the switch module is continuously in the second state, the formation control circuit is configured to control the voltage applied by the power module to the battery cell and/or to control the current provided by the power module to flow through the battery cell, so that the battery cell is in the constant current charging mode.

When the switch module repeatedly switches between the first state and the second state, the formation control circuit is configured to control the voltage applied by the power module to the battery cell and/or to control the current provided by the power module to flow through the battery cell, so that the battery cell is in the constant voltage charging mode.

In one of the embodiments, the switch module includes a first switch unit and a second switch unit.

A first end of the first switch unit is electrically connected to the current limiting module, and a second end of the first switch unit is electrically connected to the power output end.

A first end of the second switch unit is electrically connected to the current limiting module, one end of the battery cell is electrically connected to a second end of the second switch unit, and another end of the battery cell is electrically connected to the power output end.

When the switch module is in the first state, the first switch unit is turned on, the second switch unit is turned off, and a current is configured to flow from the power input end through the current limiting module, the first switch unit, and the power output end in turn.

When the switch module is in the second state, the second switch unit is turned on, the first switch unit is turned off, and a current is configured to flow from the power input end through the current limiting module, the second switch unit, the battery cell, and the power output end in turn.

In one of the embodiments, when the first switch unit is turned off and the second switch unit is continuously turned on, the formation control circuit is configured to control the battery cell to be in the constant current charging mode.

When the first switch unit and the second switch unit are turned on alternately, the formation control circuit controls the battery cell to be in the constant voltage charging mode.

In one of the embodiments, during the formation process, the second switch unit in each of the formation modules is turned on, and the first switch unit is turned off, so that the battery cell in each of the formation modules is first in a constant current charging mode.

In the constant current charging mode, the first switch unit and the second switch unit in the formation module corresponding to the battery cell with the voltage value higher than or equal to the preset voltage value are alternately turned on, so that the battery cell with the voltage value higher than or equal to the preset voltage value is directly switched from the constant current charging mode to the constant voltage charging mode.

In one of the embodiments, the formation module further includes a monitor module.

The monitor module is electrically connected to the battery cell, and the monitor module is configured to detect the voltage value of the battery cell.

The monitor module is further electrically connected to the formation control circuit. Under control of the monitor module, the formation control circuit is configured to control the voltage applied by the power module to the battery cell and/or to control the current provided by the power module to flow through the battery cell, so that the battery cell is switched between the constant current charging mode and the constant voltage charging mode.

In one of the embodiments, the power module includes a constant current source.

The aforementioned series formation system includes the power module and at least two formation modules. The power module is connected in series with the at least two formation modules. The at least two formation modules are connected to each other in series. The power module is configured to supply power to the at least two formation modules. Each of the formation modules includes the formation control circuit and the battery cell. The formation control circuit is electrically connected to the battery cell. The formation control circuit is configured to control the voltage applied by the power module to the battery cell and/or to control the current by the power module to flow through the battery cell, so that the battery cell is switched between the constant current charging mode and the constant voltage charging mode. During the formation process, the battery cell in the at least two formation modules with the voltage value lower than the preset voltage value is in the constant current charging mode and the battery cell with the voltage value higher than or equal to the preset voltage value is in the constant voltage charging mode. It solves the problem that in the prior art, formation requires several devices to support, and the battery needs to be transferred between several devices, which results in low formation efficiency and affects the quality of the battery after formation. It also realizes the technical effect of direct switching between constant current charging and constant voltage charging with one device, and while some batteries are charged at constant current, some batteries are charged at constant voltage, which greatly improves the efficiency of formation, reduces costs, and improves product quality.

DETAILED DESCRIPTION OF EMBODIMENTS

To make the purpose, technical solutions and advantages of this application clearer, the application will be further described in detail below in conjunction with the accompanying figures and embodiments. It should be understood that the specific embodiments described here are only used to explain the application and are not used to limit this application.

In addition, the terms "first" and "second" are only used for descriptive purposes, and cannot be understood as indicating or implying the relative importance or implicitly indicating the number of the indicated technical features. Therefore, the features defined with "first" and "second" may explicitly or implicitly include at least one feature. In the description of the invention, "multiple" means at least two, such as two, three, etc., unless otherwise clearly specified limitation are provided.

In a secondary battery production and manufacturing process, a formation process is required after a battery is manufactured, so that an active material in the battery is converted into a material with a normal electrochemical effect by means of first charging, and an effective passivation film or a solid electrolyte interface film is formed at an electrode (mainly a negative electrode). To form a uniform solid electrolyte interface film on a surface of a negative electrode material, it is usually necessary first to put the battery into a constant current charging device for constant current charging. When a voltage value of the battery reaches a preset voltage value, the battery is transferred to a constant voltage charging device for constant voltage charging to complete the battery formation. For this formation method, the battery is transferred between the constant current charging device and the constant voltage charging device, which requires several devices to work together, and cost of the devices is high. Moreover, the transfer of the battery back and forth takes a long time, and it also easily causes damage to the battery, which seriously affects quality and production efficiency of the battery.

Figure 1:
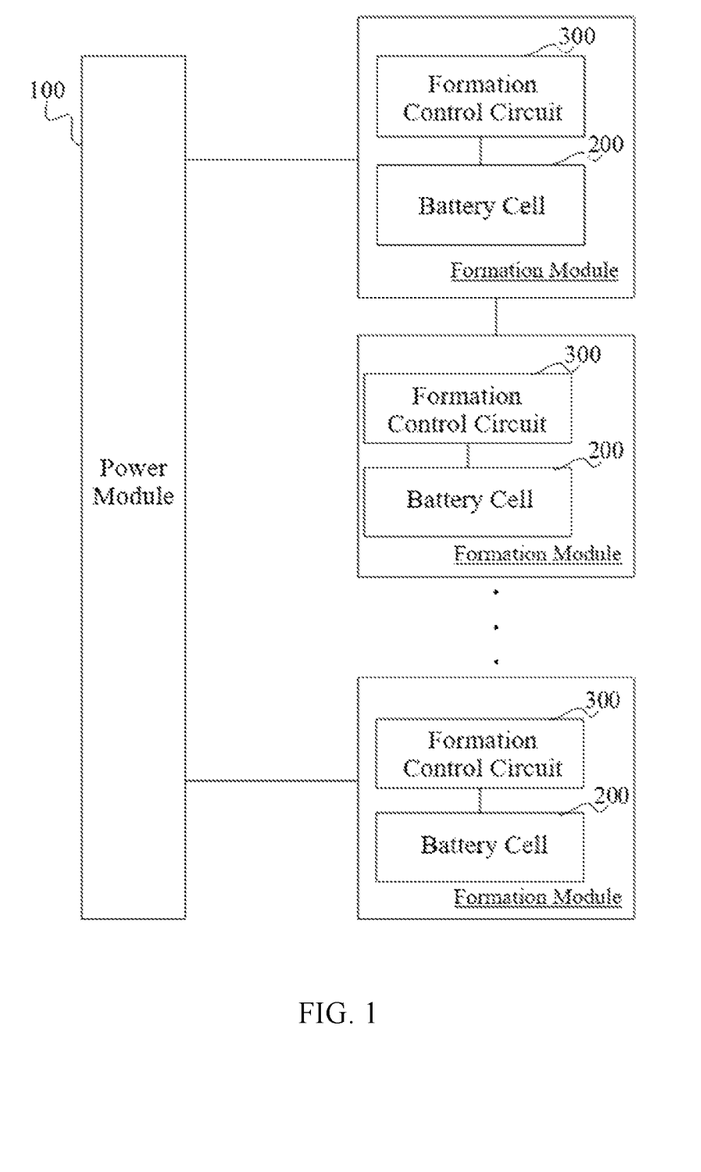
FIG. 1 is a schematic diagram of a series formation system in an embodiment.

To this end, please refer to FIG. 1. In an embodiment of the application, a series formation system is provided for battery formation. The series formation system includes: a power module 100 and at least two formation modules.

The power module 100 is connected in series with the at least two formation modules, and each formation module is connected in series. The power module 100 is used to supply power to each formation module. In one embodiment, the power module 100 is a constant current source, and current flows from a current output end of the power module 100, passes through various formation modules connected in series in turn, and reaches a current input end of the power module 100. Because the power module 100 is a constant current source, and each formation module is connected in series with the power module 100, current flowing into each formation module is equal and magnitude remains the same. In addition, constant current output by the power module 100 can be adjusted according to actual formation requirements of production, which is not limited in this application. Moreover, at least two formation modules are provided to realize formation of multiple batteries at the same time to improve production efficiency.

In an embodiment of the application, each formation module includes: a formation control circuit 300 and a battery cell 200. The formation control circuit 300 is electrically connected to the battery cell 200. The formation control circuit 300 is configured to control a voltage applied by the power module 100 to the battery cell 200 and/or to control a current provided by the power module 100 to flow through the battery cell 200, so that the battery cell 200 can be switched between a constant current charging mode and a constant voltage charging mode. Further, current and/or voltage output by the power module 100 is input to the battery cell 200 after adjusted by the formation control circuit 300. When the battery cell 200 is in the constant current charging mode, the battery cell 200 is in a constant current charging state. Charging current passing through the battery cell 200 is constant, and charging voltage between two ends of the battery cell 200 changes. When the battery cell 200 is in the constant voltage charging mode, the charging voltage applied between the two ends of the battery cell 200 is constant, and the charging current passing through the battery cell 200 changes.

In one embodiment, when the power module 100 is a constant current source, the constant current output by the power module 100 is adjusted by the formation control circuit 300 and then flows into the battery cell 200. When the current flowing into the battery cell 200 is controlled to be constant by the formation control circuit 300, the battery cell 200 is in the constant current charging state. When the formation control circuit 300 controls the current flowing out of the battery cell 200 to change so that the voltage between the two ends of the battery cell 200 is constant, the battery cell 200 is in a constant voltage charging state.

In a process of the battery formation, in each formation module, the battery cell 200 with a voltage value lower than a preset voltage value is in the constant current charging mode, and the battery cell 200 with a voltage value higher than or equal to the preset voltage value is in the constant voltage charging mode. In detail, when the power module 100 is the constant current source, the voltage value of the battery cell 200 is monitored in real time during the battery formation process, and for the battery cell 200 with the voltage value lower than the preset voltage value, the formation control circuit 300 controls the current flowing through it to be constant to make it in the constant current charging mode and for the battery cell 200 with the voltage value higher than or equal to the preset voltage value the formation control circuit 300 adjusts the current flowing through it to change to make it in the constant voltage charging mode. A magnitude of the preset voltage value can be set according to actual production requirements, which is not limited in this application.

Further, Because a voltage value of the battery cell 200 before the formation is very small, it will inevitably be lower than the above-mentioned preset voltage value. Therefore, during the formation process, an initial voltage value of the battery cell 200 in each formation module is lower than the preset voltage value. That is, during the formation process, the formation control circuit 300 in each formation module controls the current flowing through the battery cell 200 to be constant, so that the battery cell 200 in each formation module is first in the constant current charging mode for charging. because each formation module is connected in series with the power module 100, the current passing through each battery cell 200 is equal and remains constant.

During a constant current charging process, the voltage value of each battery cell 200 continues to rise. In an actual production process, due to fluctuation between the battery cells, there are differences of the initial voltage values of the battery cells 200 and differences of voltage rising speeds during the constant current charging process. This makes times for the battery cells 200 to reach the preset voltage value inconsistent, that is, some battery cells 200 among these battery cells 200 reach the preset voltage value in advance, and the voltage values of remaining battery cells 200 are still lower than the preset voltage value. In this case, the formation control circuit 300 directly switches the battery cell 200 with the voltage value higher than or equal to the preset voltage value from the constant current charging mode to the constant voltage charging mode. In detail, when the power module 100 is a constant current source, the formation control circuit 300 adjusts the current flowing through the battery cell 200 with the voltage higher than or equal to the preset voltage value, so that it is directly switched from the constant current charging mode to the constant voltage charging mode. The remaining battery cells 200, with the voltage values lower than the preset voltage value, are still charged in the constant current charging mode.

With the above series formation system, it is possible to simultaneously form multiple battery cells 200 at the same time, which improves the efficiency of the formation. Moreover, during the formation process, all battery cells 200 are first in the constant current charging mode, so that the voltage value of each battery cell 200 continues to rise. Subsequently, the battery cells 200 with the voltage value higher than or equal to the preset voltage value are directly switched from the constant current charging mode to the constant voltage charging mode to achieve a technical effect of charging some of the battery cells 200 in a series formation system with constant current while charging some of the battery cells 200 with a constant voltage. There is no need to transfer the battery cells back and forth between the constant current charging device and the constant voltage charging device, and only one device is needed to perform constant current charging and constant voltage charging on the battery cell 200, which saves cost of devices and occupation of space. Moreover, because the transfer between the constant current charging device and the constant voltage charging device is eliminated, time is saved and production efficiency is improved, meanwhile, scratches on surfaces of the battery cell 200 during the transfer process are avoided, thereby improving product quality.

In addition, with the above series formation system, during the formation process, the battery cells 200 with the voltage value higher than or equal to the preset voltage value are directly switched from the constant current charging mode to the constant voltage charging mode. There is no need to wait for all the battery cells 200 to reach the preset voltage value before performing constant voltage charging to all, which improves formation efficiency, avoids waste of electric energy caused by overcharging, saves resources, and reduces cost. Furthermore, a seamless connection between the constant current charging mode and the constant voltage charging mode makes the solid electrolyte interface film generated during the formation of the battery cell 200 more dense, and the electrochemical properties of the battery cell 200 are more stable. Compared with constant voltage charging at an interval after constant current charging, the product quality of the battery cell 200 is greatly improved.

In addition, when the battery cell 200 reaches the preset voltage value, a constant current charging continuously without switching to the constant voltage charging mode for charging will easily cause the battery cell 200 to be excessively polarized, thereby affecting the product quality of the battery cell 200. And the times for every battery cell 200 to reach the preset voltage value are inconsistent, waiting all battery cells reaching the preset voltage value before performing constant voltage charging still cause durations of excessive constant current charging for every battery cell 200 inconsistent, which not only affects the product quality of the battery cells 200, but also makes the quality of the battery cells 200 formed in the same batch in the series formation system inconsistent, which is not conducive to consistency of the products. Therefore, each battery cell 200 in the series formation system can be switched into a constant voltage charging mode immediately after reaching the preset voltage value, which not only ensures formation quality of each battery cell 200, but also ensures consistency of multiple battery cells 200, so that the battery cells 200 after the formation are all high-quality products with extremely similar electrochemical properties.

It should be noted that the series formation system provided in the application can reduce line loss compared with a non-series formation device. Also, because the current passing through each battery cell 200 connected in series must be equal, the consistency of each battery cell 200 after the formation is completed can also be improved.

In one embodiment, each formation module includes: a power input end and a power output end. When the multiple formation modules are connected in series, in the series connection direction, a power input end of the later formation module is electrically connected to a power output end of the former formation module. And in a series connection direction, a power input end of a first formation module is electrically connected to a positive electrode of the power module 100, and a power output end of a last formation module is connected to a negative electrode of the power module 100. In detail, as shown in FIG. 1, when the power module 100 is a constant current source, the current flows from the positive electrode of the power module 100, flows into the first formation module through the power input end of the first formation module in the series connection direction, then flows out from the power output end of the first formation module, then flows into a second formation module through the power input end of the second formation module, then flows out from the power output end of the second formation module, and so on until it passes through a power input end of the last formation module in the series connection direction into the last formation module, and then the current flows out from the power output end of the last formation module and returns to the negative electrode of the power module 100, thus forming a series circuit. In the series circuit, the currents passing through various formation modules are equal in magnitude. Optionally, the current flows in at the power input end, passes through the formation control circuit 300 and the battery cell 200 in the formation module in turn, and flows out at the power output end. It should be noted that the series connection direction is from the positive electrode of the power module 100 through each of the formation modules in turn, and back to the negative electrode of the power module 100. The positive electrode of the power module 100 can be the power output end of the power module 100, and the negative electrode can be the power input end of the power module 100, which is not limited in this application.

Figure 2:
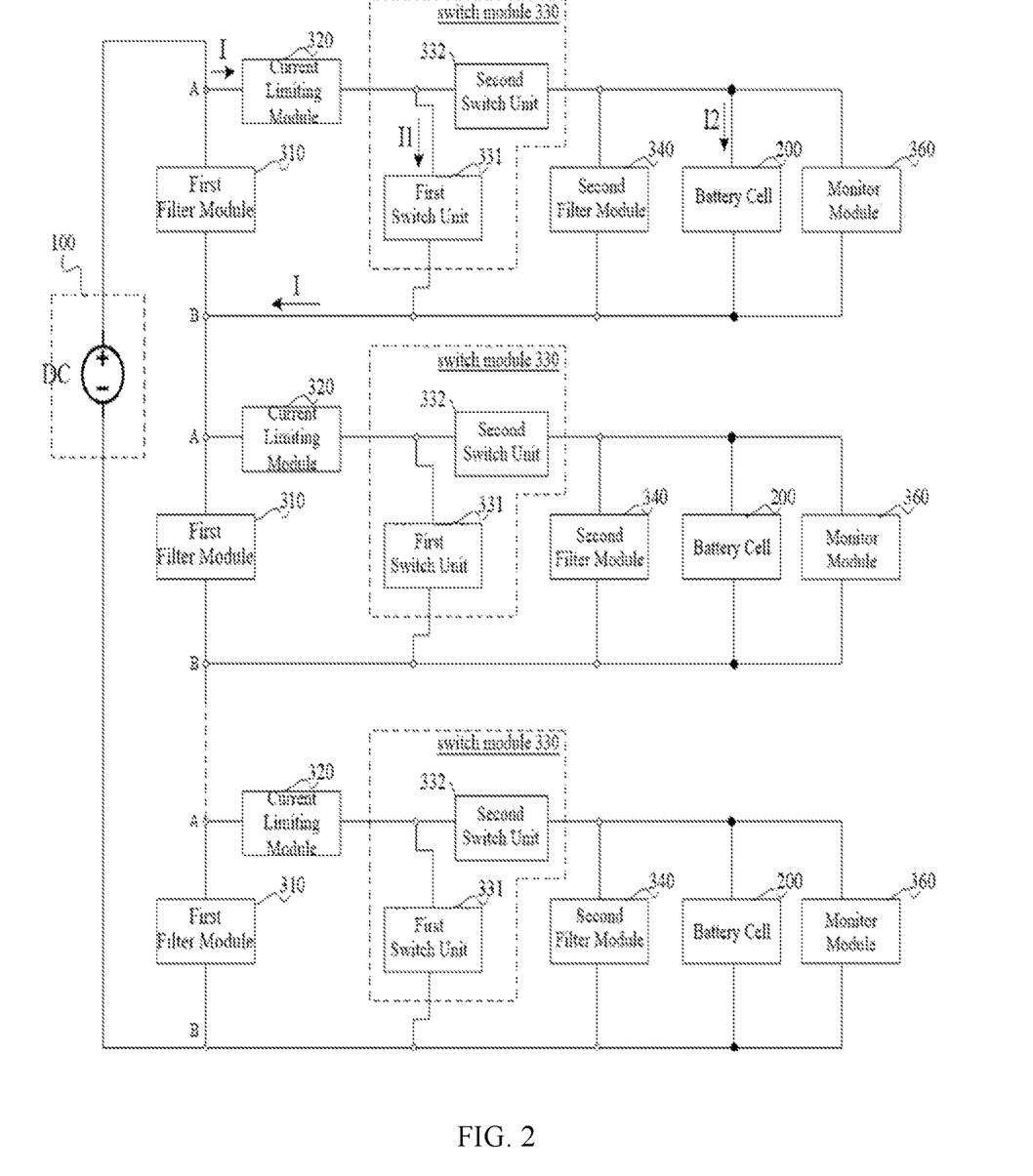
FIG. 2 is a schematic diagram of a series formation system in another embodiment.

In an embodiment of the application, referring to FIG. 2, each formation control circuit 300 includes: a first filter module 310, a current limiting module 320, a switch module 330, and a second filter module 340. Each formation module includes a power input end A and a power output end B. One end of the first filter module 310 is electrically connected to the power input end A, and another end of the first filter module 310 is electrically connected to the power output end B. One end of the current limiting module 320 is electrically connected to the power input terminal A, and another end of the current limiting module 320 is electrically connected to the switch module 300. One end of the second filter module 340 is electrically connected to the switch module 330, and another end of the second filter module 340 is electrically connected to the power output end B. One end of the battery cell 200 is electrically connected to the switch module 330, and another end of the battery cell 200 is electrically connected to the power output end B. The switch module 330 is further electrically connected to the power output end B. The switch module 330 includes at least a first state and a second state. When the switch module 330 is in the first state, the current flows from the power input end A through the current limiting module 320, the switch module 330, and the power output end B in turn. When the switch module is in the second state, the current flows from the power input end A through the current limiting module 320, the switch module 330, the battery cell 200, and the power output end B in turn. It should be noted that the switch module 330 may include other states for other purposes, which is not limited in this application.

In detail, in an embodiment of the application, the formation control circuit 300 controls the voltage applied by the power module 100 to the battery cell 200 and/or to control the current provided by the power module 100 to flow through the battery cell 200, so that the battery cell 200 is switched between the constant current charging mode and the constant voltage charging mode, which is mainly realized by switching the switch module 330 between the first state and the second state. When the switch module 330 is continuously in the second state, the formation control circuit 300 controls the battery cell 200 to be in a constant current charging mode. When the switch module 330 repeatedly switches between the first state and the second state, the formation control circuit 300 controls the battery cell 200 to be in a constant voltage charging mode. Optionally, the switch module 330 may include a single-pole double-throw switch, a CMOS switch, a switch module composed of multiple switches, etc., as long as it can switch the current flowing direction. The application does not limit this.

Taking the power module 100 as a constant current source as an example, when the switch module 330 is continuously in the second state, the current flows from the power input end A through the current limiting module 320, the switch module 330, the battery cell 200, and the power output end B in turn, and the battery cell 200 is in the constant current charging mode. In other words, during the formation process, first the switch modules 330 in the formation control circuit 300 of each formation module continue to be in the second state. A constant current enters from the power input end A of each formation module and flows out from the power output end B. Each battery cell 200 is in the constant current charging mode, the charging current of each battery cell 200 has the same magnitude, and the voltage value of each battery cell 200 continues to rise. In this case, the current limiting module 320, the first filter module 310, and the second filter module 340 mainly provide filtering function.

In the constant current charging mode, when the voltage value of the battery cell 200 is higher than or equal to the preset voltage value, the switch module 330 starts to repeatedly switch between the first state and the second state to adjust the current flowing through the battery cell 200, thereby adjusting the charging voltage value of the battery cell 200, so that the battery cell 200 is in the constant voltage charging mode. In detail, the state of the switch module 330 periodically changes at a certain frequency, and a time when the switch module 330 switching from the first state to the second state is defined as a change period. In the constant voltage charging mode, the switch module 330 adjusts the current flowing through the battery cell 200 by controlling a time that the switch module 330 is in the first state and in the second state in a period, so as to adjust the voltages between the two ends of the battery cell 200, so that the battery cell 200 is in the constant voltage charging mode. It should be noted that a frequency of a periodic change of the switch module 330 can be set according to actual production requirements, which is not limited in this application.

In addition, in the constant voltage charging mode, as the voltage value of the battery cell 200 gradually rises, the time that the switch module 330 is in the first state in one change period becomes longer, and the time that the switch module 330 is in the second state becomes shorter. This makes the current flowing through the battery cell 200 gradually decrease, but in this process, the current passing through the power input end A and the power output end B of the formation module remains unchanged. Therefore, in the series formation system provided by the application, the switching of the charging modes of the battery cell 200 in a single formation module will not affect the current flowing into the power input ends of other formation modules, that is, it will not affect the charging modes of the battery cell 200 in other formation modules. Therefore, the series formation system provided by the application can realize the switching of the battery cell 200 between the constant current charging mode and the constant voltage charging mode, and also realize charging of some of the battery cells 200 with the constant current while charging some of the battery cells 200 with the constant voltage.

Optionally, referring to FIG. 2, the switch module 330 includes a first switch unit 331 and a second switch unit 332. A first end of the first switch unit 331 is electrically connected to the current limiting module, and a second end of the first switch unit 331 is electrically connected to the power output end. A first end of the second switch unit 332 is electrically connected to the current limiting module, one end of the battery cell 200 is electrically connected to a second end of the second switch unit 332, and another end of the battery cell 200 is electrically connected to the power output end B. When the switch module 330 is in the first state, the first switch unit 331 is turned on, the second switch unit 332 is turned off, and the current flows from the power input end A through the current limiting module 320, the first switch unit 331, and the power output end B. When the switch module 330 is in the second state, the second switch unit 332 is turned on, the first switch unit 331 is turned off, and the current flows from the power input end A through the current limiting module 320, the second switch unit 332, the battery cell 200, and the power output end B.

Figure 3:
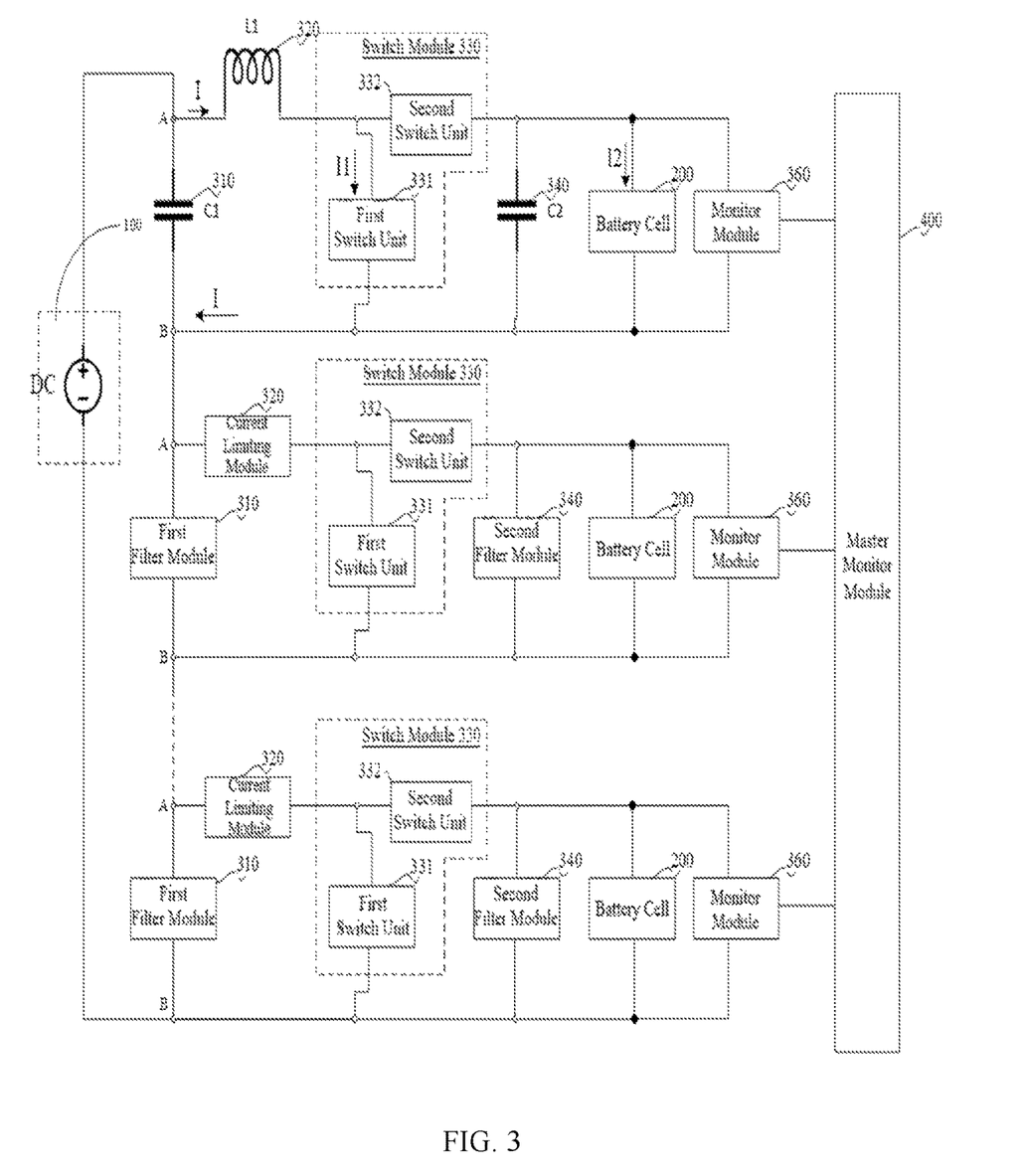
FIG. 3 is a schematic diagram of a series formation system in yet another embodiment.

Referring to FIG. 3, in an embodiment of the application, the current limiting module 320 includes an inductor L1, the first filter module 310 includes a capacitor C1, and the second filter module 340 includes a capacitor C2. The first switch unit 331 and the second switch unit 332 both include a metal oxide semiconductor (MOS) transistor. The current flowing into the power input end A is denoted as I, the current flowing through the first switch unit 331 is denoted as I1, and the current flowing through the battery cell 200 is denoted as I2.

During the formation process, in each formation module, the second switch unit 332 is turned on, the first switch unit 331 is turned off, and the current flowing through the battery cell 200 is I2=I, where I1=0 and I1+I2=I. In this case, the battery cell 200 is in the constant current charging mode, and the first filter module 310, the current limiting module 320, and the second filter module 340 function as a DC filter.

When the voltage value of the battery cell 200 reaches the preset voltage value, the first switch unit 331 and the second switch unit 332 alternately turn on and off at a certain frequency, that is, the switch module 330 switches between the first state and the second state, so that the battery cell 200 is in the constant voltage charging mode. In this case, the first filter module 310, the current limiting module 320, the first switch unit 331, the second switch unit 332, and the second filter module 340 form a boost circuit. By controlling duty ratios of the first switch unit 331 and the second switch unit 332, the current flowing through the battery cell 200 can be controlled, that is, the voltages between the two ends of the battery cell 200 can be controlled, thereby realizing constant voltage charging.

In detail, in the constant voltage charging mode, when the first switch unit 331 is turned off, the voltage across the capacitor C1 is equal to the voltage across the battery cell 200, and the current flowing through the inductor L1 is equal to the current I flowing through the power input end A. Because the current flowing through the inductor L1 cannot change suddenly, the current passing through the inductor L1 will gradually increase starting from I after the duty ratio of the first switch unit 331 is greater than zero, and the first switch unit 331 is turned on. In this case, the current flowing through the power input end A can no longer charge the capacitor C1, and even a small part of the energy of the capacitor C1 will also charge the inductor L1 to maintain the increased current of the inductor L1. Therefore, the voltage value across the capacitor C1 will become lower than the voltage value of the battery cell 200. In this case, as long as the duty ratio of the first switch unit 331 in the boost circuit is controlled, the voltage value across the capacitor C2, which is the voltage value across the battery cell 200, can be controlled to achieve the constant voltage charging. As the voltage value of the battery cell 200 gradually increases, the duty ratio of the first switch unit 331 becomes greater and the corresponding current I1 flowing through the first switch unit 331 becomes higher, and the duty ratio of the second switch unit switch 332 is getting less and the corresponding current I2 flowing through the battery cell 200 is getting lower. In this process, I1+I2=I will always be maintained, so that in a series charging structure, the current I2 passing through the battery cell 200 can be gradually reduced and the battery cell 200 can be charged at a constant voltage while the current flowing into the power input ends of other formation modules will not be affected. That is, the series formation system provided by the application can not only switch the battery cell 200 between the constant current charging mode and the constant voltage charging mode, but also realize, without disconnecting the circuit, the charging of some battery cells 200 with constant current and the charging of some of the battery cells 200 switched from the constant current charging mode to the constant voltage charging mode. In addition, the electric energy provided by the power module 100 is completely used for charging, which is energy-saving and efficient. Moreover, because the application adopts a series formation structure, the switching between constant current charging and constant voltage charging within a single formation module will not affect the current flowing into the power input ends of other formation modules. Therefore, in the series formation system provided by the application, when switching between the constant current charging mode and the constant voltage charging mode, a switching speed is fast, and the current flowing into the power input end of each formation module will not fluctuate, thereby the damage to the battery cell 200 caused by current fluctuations during the switching between constant current charging and constant voltage charging is avoided, and the quality of the battery cell 200 after the formation is improved.

In addition, the capacitor C1 also plays a role in eliminating an instantaneous impact on the input voltage. The instantaneous impact is coming from line inductance and switching dead zones of other formation modules. It avoids from instability of charging current caused by an input voltage jump. The capacitor C2 further plays a role in eliminating the effect on fluctuation coming from the output line inductance and the contact resistance of nail bed of the battery cell 200.

Optionally, referring to FIG. 2, in an embodiment of the application, the formation module further includes a monitor module 360. The monitor module 360 is electrically connected to the battery cell 200, and the monitor module 360 is configured to detect the voltage value of the battery cell 200. The monitor module 360 is further electrically connected to the formation control circuit 300. The formation control circuit 300 controls the voltage applied by the power module 100 to the battery cell 200 and/or controls the current provided by the power module 100 to flow through the battery cell 200 under the control of the monitor module 360, so that the battery cell 200 is switched between the constant current charging mode and the constant voltage charging modes. In detail, the monitor module 360 includes a single-chip microcomputer. The monitor module 360 is respectively connected to the battery cell 200 and the switch module 330. The monitor module 360 controls the switch module 330 to switch between the first state and the second state according to the detected voltage value of the battery cell 200. For example, the monitor module 360 may send a modulation and demodulation signal to the first switch unit 331 and the second switch unit 332 to control the first switch unit 331 and the second switch unit 332 to turn on or off, that is, to control the duty ratio of the first switch unit 331 and the second switch unit 332.

Optionally, referring to FIG. 3, the series formation system also includes a master monitor system 400. The master monitor system 400 communicates with the monitor module 360 in each formation module. The master monitor system 400 is configured to receive parameters fed back from the monitor module 360, process the parameters, and control the switch module 330 through the monitor module 360 according to a processing result. The parameters fed back by the monitor module 360 include the voltage value of the battery cell 200, the voltage applied to the battery cell 200, a temperature of the battery cell 200, the current flowing through the battery cell 200, the state of the switch module 330, etc., which are not limited in the application. In addition, the master monitor system 400 may be provided to directly monitor and control the parameters of each formation module without the monitor module 360. Optionally, the master monitor system 400 may be a host computer, a computer, etc., which is not limited in embodiments of the application.

Optionally, the formation control circuit also includes an anti-reverse connection module (not shown in the figures), one end of the anti-reverse connection module is electrically connected to the battery cell 200, and another end is electrically connected to the power output end. The anti-reverse connection module is configured to prevent a short circuit caused by a reverse connection of the battery cells.

It should be noted that the power module 100 in an embodiment of the application includes, but is not limited to, a constant current source, as long as it can provide a constant current for each formation module connected in series. The application does not limit this.

Optionally, in an embodiment of the application, when the battery cell 200 is charged in the constant voltage charging mode for a period of time and after the formation is completed, the switch module 330 continues to maintain the first state, the battery cell 200 is disconnected from the charging circuit, and the current flows from the power input end through the current limiting module 320, the switch module 330, and the power output end in turn, and then flows into the power input end of the next formation module in the series connection direction. In detail, the first switch unit 331 is continuously turned on, the second switch unit 332 is continuously turned off, and the current flows from the power input end through the current limiting module 320, the first switch unit 331, and the power output end in turn, and then flows into the next formation module in the series connection direction, while the current is still equal to I. In this case, the battery cell 200 that has been completed the formation can be taken out of the series formation system and enter a next process. It not only avoids from overcharging of the battery cell 200, improves the quality of the battery cell 200, and avoids from energy waste, but also improves productivity.

Optionally, in an embodiment of the application, the power module 100 may further be electrically connected to the master monitor module 400. The power module 100 is configured to output electric power to the formation module under the control of the master monitor module 400. In addition, a special control module may also be provided for the power module 100 to control it to output electric power to the formation module, for example, to control the power module 100 to output a constant current to the formation module, which is not limited in the application.

In summary, the series formation system provided by the application can realize simultaneous formation of multiple battery cells, which improves the efficiency of formation. Moreover, during the formation process, the battery cells can be switched between the constant current charging and the constant voltage charging. There is no need to transfer the battery cells back and forth between the constant current charging device and the constant voltage charging device, and only one device is needed to perform the constant current charging and the constant voltage charging on the battery cell 200, which saves cost of devices and space occupied. Because the transfer between the constant current charging device and the constant voltage charging device is eliminated, time is saved and production efficiency is improved, meanwhile, surface scratches of the battery cell 200 resulted from the transfer process are also avoided, thereby improving the product quality.

In addition, during the formation process, the battery cells, which are charged with constant current at a same time, with a voltage higher than or equal to the preset voltage value are directly switched from the constant current charging mode to the constant voltage charging mode, while the remaining battery cells are still in the constant current charging mode. There is no need to wait for all the battery cells 200 to reach the preset voltage value before performing constant voltage charging to all and no need to disconnect the charging circuit, the whole process is continuous and the charging process is uninterrupted, which improves the formation efficiency, avoids from waste of electric energy caused by overcharging, saves resources, and reduces cost. Furthermore, a seamless connection between the constant current charging mode and the constant voltage charging mode makes the solid electrolyte interface film generated during the formation of the battery cell 200 more dense, and the electrochemical properties of the battery cells are more stable. Compared with constant voltage charging at an interval after constant current charging, the product quality of the battery cells is greatly improved.

In addition, when the battery cell reaches the preset voltage value, if the constant current charging is continued without switching to the constant voltage charging mode for charging, it will easily cause the battery cell to be excessively polarized, thereby affecting the product quality of the battery cell. And the time for each battery cell to reach the preset voltage value is inconsistent, waiting all battery cells reaching the preset voltage value before performing constant voltage charging still cause the durations of excessive constant current charging for each battery cell inconsistent, which not only affects the product quality of the battery cells, but also makes the quality of the battery cells formed in the same batch in the series formation system inconsistent, which is not conducive to the consistency of the products. Therefore, each battery cell in the series formation system can be switched into a constant voltage charging mode immediately after reaching the preset voltage value, which not only ensures the formation quality of each battery cell, but also ensures the consistency of multiple battery cells, so that the battery cells after the formation are all high-quality products with extremely similar electrochemical properties, and more convenient to form a battery module with multiple battery cells for use.

The various technical features of the above embodiments can be combined arbitrarily. To make the description concise, not all possible combinations of the various technical features in the above embodiments are described. However, as long as there is no contradiction in the combination of these technical features, it should be considered to be within the range described in the application.

The above embodiments only describe several implementations of the application, and the descriptions are more specific and detailed, but cannot therefore be considered as limitations on the scope of invention patents. It should be noted that for those of ordinary skill in the art, under the premise of not departing from the concept of the application, several modifications and improvements can also be made, which all belong to the scope of protection of the application. Therefore, the scope of protection of the application shall be subject to the appended claims.

What is claimed is:

1. A series formation system configured for battery formation, wherein the series formation system comprises: a power module and at least two formation modules;
    wherein the power module is connected to the at least two formation modules in series, the at least two formation modules are connected to each other in series, and the power module is configured to supply power to the at least two formation modules;
    wherein each of the formation modules comprises: a formation control circuit and a battery cell, a power input terminal, and a power output terminal;
    wherein the formation control circuit comprises: a first filter module, a current limiting module, a switch module, and a second filter module;
    wherein one terminal of the first filter module is electrically connected to the power input terminal, and another terminal of the first filter module is electrically connected to the power output terminal;
    wherein one terminal of the current limiting module is electrically connected to the power input terminal, and another terminal of the current limiting module is electrically connected to the switch module;
    wherein one terminal of the second filter module is electrically connected to the switch module, and another terminal of the second filter module is electrically connected to the power output terminal;
    wherein one terminal of the battery cell is electrically connected to the switch module, and another terminal of the battery cell is electrically connected to the power output terminal;
    wherein the switch module is electrically connected to the power output terminal; and
    wherein the formation control circuit is configured to control a voltage applied by the power module to the battery cell or to control a current provided by the power module to flow through the battery cell, so that the battery cell is switched between a constant current charging mode and a constant voltage charging mode; and
    wherein during a formation process, the battery cell in the at least two formation modules with a voltage value lower than a preset voltage value is in the constant current charging mode, and the battery cell with a voltage value higher than or equal to the preset voltage value is in the constant voltage charging mode.

2. The series formation system of claim 1, wherein during the formation process, the battery cell of each of the formation modules is first charged in the constant current charging mode, and in the constant current charging mode, the formation control circuit is configured to directly switch the battery cell with the voltage value higher than or equal to the preset voltage value from the constant current charging mode to the constant voltage charging mode.

3. The series formation system of claim 2, wherein the at least two formation modules are connected in series, and a power input terminal of a later formation module is electrically connected to a power output terminal of a former formation module in a series connection direction; and
    wherein in the series connection direction, a power input terminal of a first one of the formation modules is electrically connected to a positive electrode of the power module, and a power output terminal of a last one of the formation modules is electrically connected to a negative electrode of the power module.

4. The series formation system of claim 3, wherein the switch module comprises at least a first state and a second state, wherein in the first state, a current is configured to flow from the power input terminal through the current limiting module, the switch module, and the power output terminal in turn, and wherein in the second state, a current is configured to flow from the power input terminal through the current limiting module, the switch module, the battery cell, and the power output terminal in turn.

5. The series formation system of claim 4, wherein the formation control circuit is configured to control the battery cell to be in the constant current charging mode by controlling the switch module continuously in the second state; and wherein the formation control circuit is configured to control the battery cell to be in the wherein the formation control circuit is configured to control the battery cell to be in the constant voltage charging mode by controlling the switch module repeatedly switching between the first state and the second state.

6. The series formation system of claim 4, wherein the switch module comprises: a first switch unit and a second switch unit;

wherein a first terminal of the first switch unit is electrically connected to the current limiting module, and a second terminal of the first switch unit is electrically connected to the power output terminal;

wherein a first terminal of the second switch unit is electrically connected to the current limiting module, one terminal of the battery cell is electrically connected to a second terminal of the second switch unit, and another terminal of the battery cell is electrically connected to the power output terminal;

wherein in the first state, the first switch unit is turned on, the second switch unit is turned off, and a current is configured to flow from the power input terminal through the current limiting module, the first switch unit, and the power output terminal in turn; and wherein in the second state, the second switch unit is turned on, the first switch unit is turned off, and a current is configured to flow from the power input terminal through the current limiting module, the second switch unit, the battery cell, and the power output terminal in turn.

7. The series formation system of claim 6, wherein the formation control circuit is configured to control the battery cell to be in the constant current charging mode by controlling the first switch unit turned off and the second switch unit continuously turned on; and wherein the formation control circuit controls the battery cell to be in the constant voltage charging mode by controlling the first switch unit and the second switch unit turned on alternately.

8. The series formation system of claim 7, wherein during the formation process, the second switch unit in each of the formation modules is turned on, and the first switch unit is turned off, so that the battery cell in each of the formation modules is first in a constant current charging mode;

wherein in the constant current charging mode, the first switch unit and the second switch unit in the formation module corresponding to the battery cell with the voltage value higher than or equal to the preset voltage value are alternately turned on, so that the battery cell with the voltage value higher than or equal to the preset voltage value is directly switched from the constant current charging mode to the constant voltage charging mode.

9. The series formation system of claim 1, wherein the formation module further comprises: a monitor module;

wherein the monitor module is electrically connected to the battery cell, and the monitor module is programmed to detect the voltage value of the battery cell; and wherein the monitor module is further electrically connected to the formation control circuit, and under control of the monitor module, the voltage applied by the power module to the battery cell or the current provided by the power module to flow through the battery cell are governed by the formation control circuit, so that the battery cell is switched between the constant current charging mode and the constant voltage charging mode.

10. The series formation system of claim 1, wherein the power module comprises a constant current source.

* * * * *